(12) United States Patent
Chen

(10) Patent No.: US 7,969,666 B2
(45) Date of Patent: Jun. 28, 2011

(54) LENS MODULE AND CAMERA MODULE USING SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 362 days.

(21) Appl. No.: 12/192,353

(22) Filed: Aug. 15, 2008

(65) Prior Publication Data

US 2009/0147381 A1    Jun. 11, 2009

(30) Foreign Application Priority Data

Dec. 6, 2007   (CN) .......................... 2007 1 0202874

(51) Int. Cl.
*G02B 7/02* (2006.01)
(52) U.S. Cl. ...................... 359/819; 359/813
(58) Field of Classification Search .................. 359/811, 359/813, 819
See application file for complete search history.

(56) References Cited

U.S. PATENT DOCUMENTS

| 5,616,066 | A | * | 4/1997 | Jacobs et al. | .................... 451/36 |
| 5,658,235 | A | | 8/1997 | Priest et al. | |
| 7,457,052 | B2 | * | 11/2008 | Hirata | .......................... 359/738 |

FOREIGN PATENT DOCUMENTS

| CN | 1164085 C | 8/2004 |
| CN | 2706777 Y | 6/2005 |
| CN | 1961224 A | 5/2007 |

\* cited by examiner

*Primary Examiner* — Ricky L Mack
*Assistant Examiner* — Brandi N Thomas
(74) *Attorney, Agent, or Firm* — Andrew C. Cheng

(57) ABSTRACT

A lens module includes a barrel and at least one lens. The barrel includes a cover with a hole defined therein and a hollow cylinder extending from the cover. The barrel comprises a cover with a hole defined therein and a hollow cylinder extending from the cover, and the cover comprises a roughened inside surface facing towards the hollow cylinder. The at least one optical lens is received in the barrel and comprises an optically active part and a peripheral optically non-active part around the optically active part, the optically non-active part comprises two opposite roughened surfaces.

10 Claims, 2 Drawing Sheets

LENS MODULE AND CAMERA MODULE USING SAME

BACKGROUND

1. Technical Field

The present invention relates to lens modules, and particularly, to an antiglare lens module and a camera module using the same.

2. Description of Related Art

With the development of the optical imaging technology, camera modules are widely used in electronic devices, such as digital cameras, and mobile phones.

Generally, a conventional camera module includes a barrel, a plurality of optical elements (e.g., lenses and infrared-cut filters) received in the barrel, and an image sensor. Some light beams enter the barrel and transmit through the optical elements along an intended path, and then are sensed by the image sensor to form an image. However, some redundant light beams may not transmit (e.g., refract) directly along the intended path, but reflect among the optical elements and in the barrel for many times (back and forth) before finally reaching the image sensor. As a result of that, lens glare is caused on the image, that is, undesired artifacts may appear on the image, and the image is in a state of distortion.

Therefore, what is needed is a lens module, which has a capability of avoiding lens glare.

SUMMARY

A lens module, in accordance with a present embodiment, is provided. A lens module includes a barrel and at least one lens. The barrel comprises a cover with a hole defined therein and a hollow cylinder extending from the cover, and the cover comprises a roughened inside surface facing towards the hollow cylinder. The at least one optical lens is received in the barrel and comprises an optically active part and a peripheral optically non-active part around the optically active part, the optically non-active part comprises two opposite roughened surfaces.

Other advantages and novel features will become more apparent from the following detailed description of embodiments, when taken in conjunction with the accompanying drawings.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

The exemplifications set out herein illustrate various preferred embodiments, in various forms, and such exemplifications are not to be construed as limiting the scope of the present lens module in any manner.

DETAILED DESCRIPTION

Figure 1:
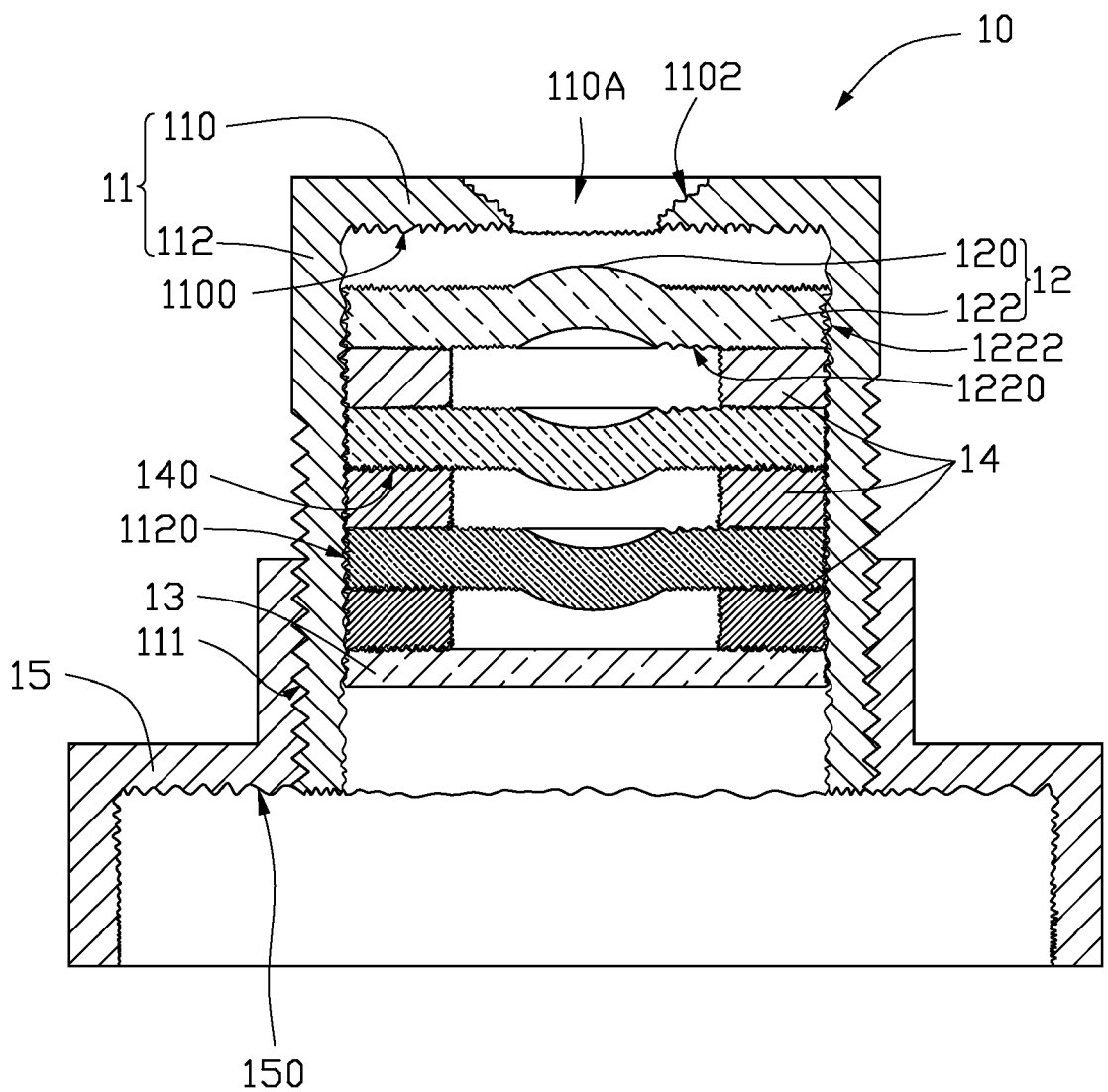
FIG. 1 is a schematic, cross-sectional view of a lens module, in accordance with the first embodiment.

Referring to FIG. 1, a lens module 10 in accordance with a first exemplary embodiment, is provided. The lens module 10 includes a barrel 11, three optical lenses 12, a filter 13, three spacers 14 and a holder 15.

The barrel 11 includes a cover 110 and a hollow cylinder 112. The hollow cylinder 112 extends from the cover 110 and is integrated with the cover 110. A taper-shaped hole 110A is defined in the cover 110 for light to enter the hollow cylinder 112.

The optical lens 12 includes an optically active part 120 and a peripheral optically non-active part 122. The peripheral optically non-active part 122 surrounds the optically active part 120. The optically active part 120 is configured for allowing light transmitting therein. The peripheral optically non-active part 122 is configured for supporting the optically active part 120.

The optical lens 12 can be a glass lens or a plastic lens. The filter 13 can be an infrared-cut filter. In assembly, the three optical lenses 12, the filter 13 and the three spacers 14 are received in the barrel 11, in the order written, from an imaging side to an object side. Each one of the spacers 14 may be positioned between each one of the three optical lenses 12 in an alternate fashion, such as a spacer 14 is place between two adjacent optical lenses 12. Additionally, a space 14 may be placed between a last optical lens 12 and the filter 13. The spacers 14 are configured for spacing the three optical lenses 12 and the filter 13. Then the barrel 11 is threadedly coupled to the holder 15. It should be noted, that the lens module 10 is not limited to have the above-mentioned three optical lenses 12 and three spacers 14, the lens module 10 including a optical lens 12 and a spacers 14, is acceptable as well.

The cover 110 with the hole 110A defined therein includes an inside surface 1100 facing towards the hollow cylinder 112. The peripheral optically non-active part 122 of each optical lens 12 includes two opposite surfaces 1220. Each of the three spacers 14 has a surface 140. The inside surface 1100 of the cover 110, the two opposite surfaces 1220 and the surface 140 of each spacer 14 are roughened surfaces for avoiding reflection of the light incident thereon.

Figure 2:
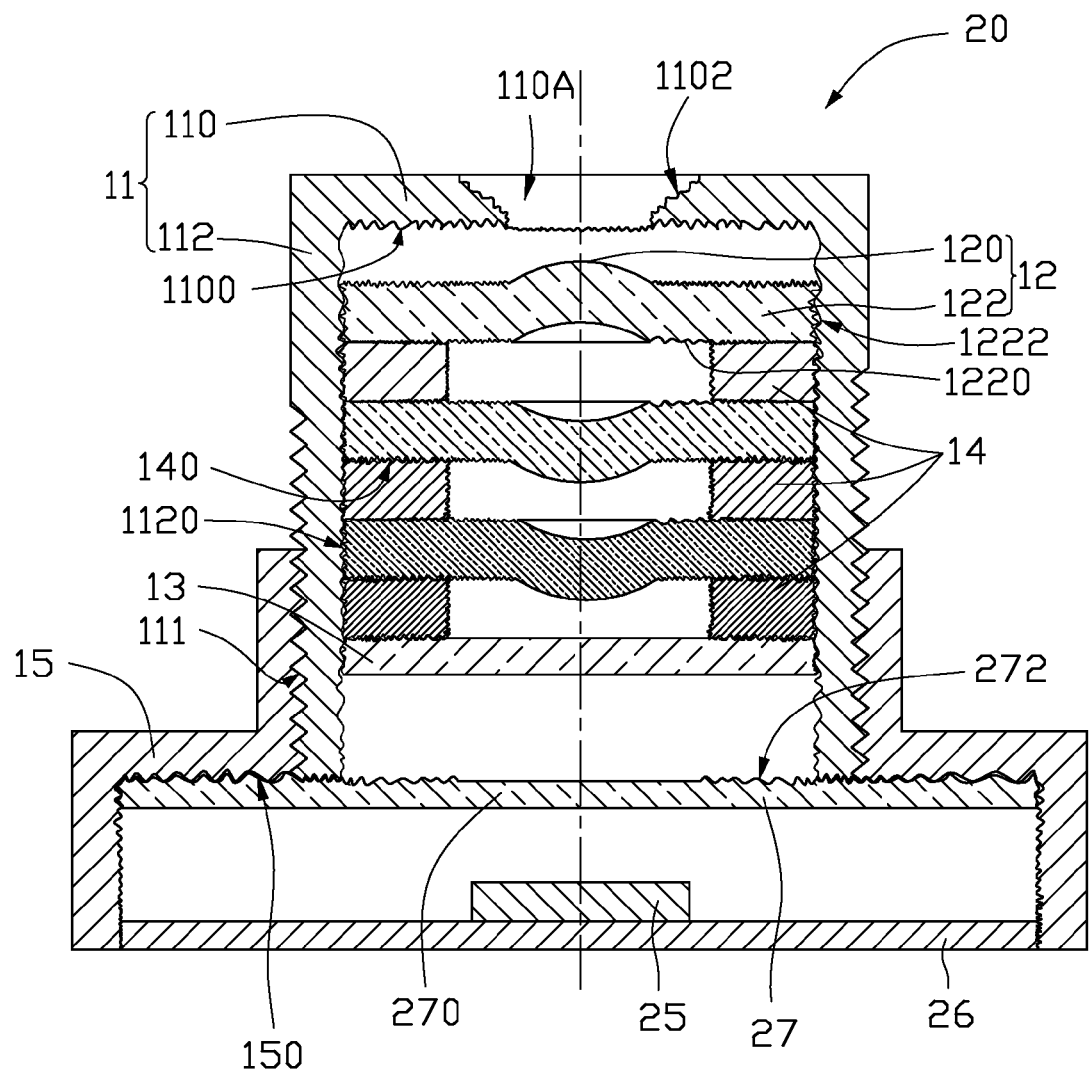
FIG. 2 is a schematic, cross-sectional view of a camera module, in accordance with the second embodiment.

FIG. 2 shows a camera module 20, in accordance with the second embodiment. The camera module 20 includes the lens module 10 of the first embodiment and an image sensor 25.

The image sensor 25 can be a charge-coupled device (CCD) or a complementary metal oxide semiconductor device (CMOS) mounted on a circuit board 26. The circuit board 26 is electrically connected to the image sensor 25. The light of an object enters the hollow cylinder 112 through the hole 110A. Then the light transmits in an intended path through the optical parts 120 of the three optical lenses 12 in turn to arrive at the image sensor 25. The image sensor 25 is received in the holder 15 and arranged opposite to the optical parts 120 of the optical lenses 12 to sense the light transmitting through the optical lenses 12, thus generates a sensing signal of the object.

The camera module 20 can further includes a plate 27. The plate 27 is arranged between the barrel 11 and the sensor 25 for protecting the sensor 25. For example, the plate 27 can prevent the sensor 25 from being polluted by dust. In one embodiment, the plate 27 includes a transparent region 270 corresponding to the optical parts 120 of the optical lens 12 for allowing the transmission of the light to the image sensor 25. Generally, the plate 27 can be a transparent glass plate 27.

The inside surface 1100, the two opposite surfaces 1220 and the surface 140 are roughened surface for preventing non-image light that does not transmit (e.g., refract) directly along the intended path through the optical parts 120 of the three optical lenses 12 to reflect internally on the inside surface 1100, the two opposite surface 1220, the surface 140. Therefore, lens flare occurred in the camera module 20 is avoided, the camera module 20 can attain the image of the object with high fidelity.

Other surfaces, such as an inner surface 1102 of the hole 110A, an inside wall surface 1120 of the hollow cylinder 112, a inner surface 150 of the holder 15, a outer circle surface 1222 of the optical lens 12, or even an annular surface 272 of the plate 27 which surrounds the transparent region 270 and faces toward the barrel 11 can also be roughened surfaces. The barrel 11 and the holder 15 can be made of material with low reflectivity, such as black plastic.

The roughened surfaces can be manufactured by chemical etching, sand-blasting, glass-beading, laser surface etching, plasma etching, laser spot forming, laser-beam writing, physical etching, sputter etching or reactive sputtering etching. The surface roughness $R_a$ of the microstructure can be in a range from 10 nm to 10 μm, the corresponding peak to valley distance $R_{p-v}$ can be in a range from 1000 nm to 100 μm. Preferably, the surface roughness $R_a$ is in a range from 500 nm to 5μm, the corresponding peak to valley ratio $R_{p-v}$ is in a range from 5000 nm to 50 μm.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   a barrel, the barrel comprising a cover with a taper-shaped hole defined therein and a hollow cylinder extending from the cover, the cover comprising a roughened inner surface in the hole and a roughened inside surface facing towards the hollow cylinder;
   at least one optical lens received in the barrel and comprising an optically active part and a peripheral optically non-active part around the optically active part, the optically non-active part comprising two opposite roughened surfaces, wherein a surface roughness of the inner surface in the hole, the inside surface of the cover, and the opposite surfaces of the optical lens is in a range from 500 nm to 5 μm, and a peak to valley distance of the inner surface in the hole, the inside surface of the cover, and the opposite surfaces of the optical lens is in a range from 5000 nm to 50 μm.

2. The lens module of claim 1, wherein the barrel is made of black material.

3. The lens module of claim 2, wherein the black material is black plastic.

4. The lens module of claim 1, further comprising a filter and at least one spacer received in the barrel, the spacer positioned between at least one lens and the filter and comprising a roughened surface.

5. The lens module of claim 1, wherein the at least one lens comprises a plurality of lenses, the at least one spacer comprises a plurality of spacers, each two adjacent spacers have a lens positioned there between.

6. The lens module of claim 1, wherein the hollow cylinder of the barrel comprises an inside wall surface, and the inside wall surface is a roughened surface.

7. The lens module of claim 1, further comprising a holder, the barrel mechanically coupled to the holder, the holder comprising an inner surface, the inner surface of the holder is a roughened surface.

8. A camera module, comprising:
   a holder;
   a barrel, the barrel mechanically coupled to the holder and comprising a cover with a taper-shaped hole defined therein and a hollow cylinder extending from the cover, the cover comprising an inner surface in the hole and an inside surface facing towards the hollow cylinder;
   an optical lens received in the barrel and comprising an optically active part and a peripheral optically non-active part around the optically active part, the optically non-active part comprising two opposite surfaces;
   an image sensor received in the holder;
   wherein the inner surface in the hole, the inside surface of the cover, and the two opposite surfaces of the optically non-active part of the lens are roughened surfaces, wherein a surface roughness of the inner surface in the hole, the inside surface of the cover, and the opposite surfaces of the optical lens is in a range from 500 nm to 5 μm, and a peak to valley distance of the inner surface in the hole, the inside surface of the cover, and the opposite surfaces of the optical lens is in a range from 5000 nm to 50 μm.

9. The camera module of claim 8, further comprising a plate, the plate arranged between the barrel and the sensor for protecting the sensor.

10. The camera module of claim 9, wherein the plate is made of transparent glass.

* * * * *